United States Patent Office 3,153,607
Patented Oct. 20, 1964

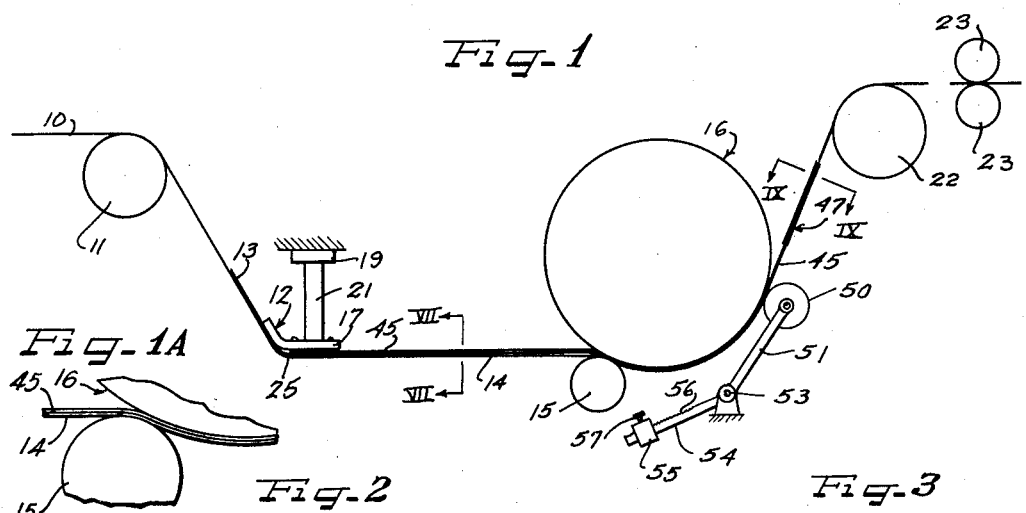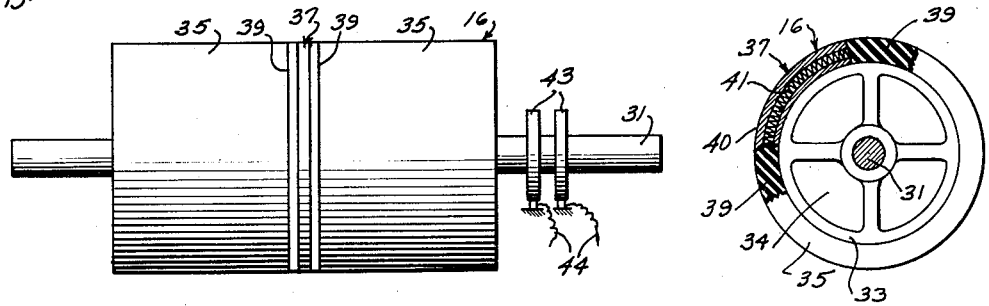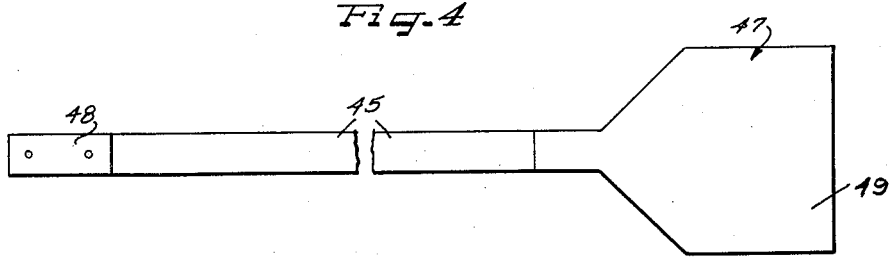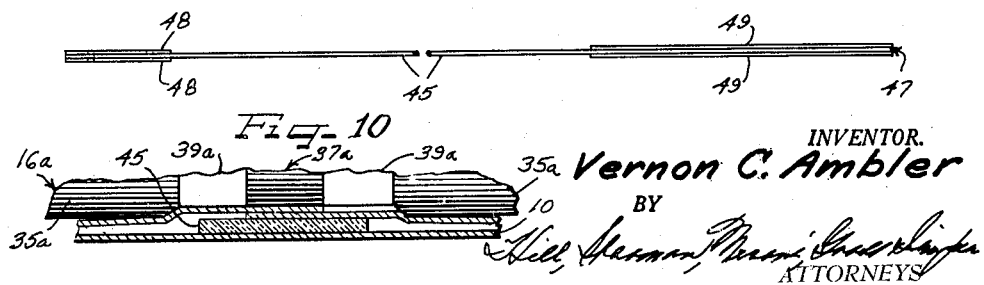

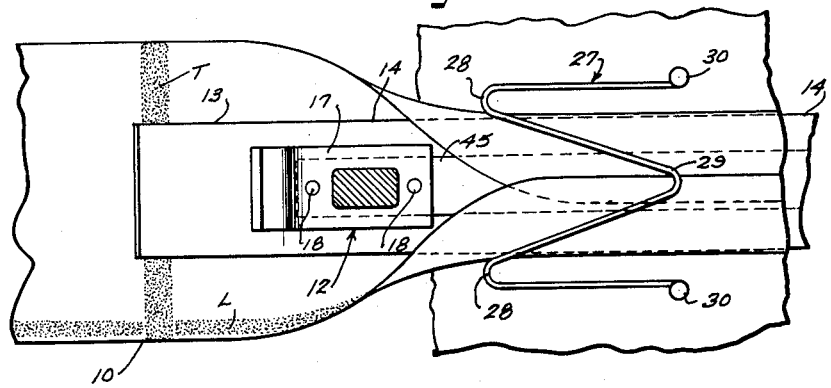
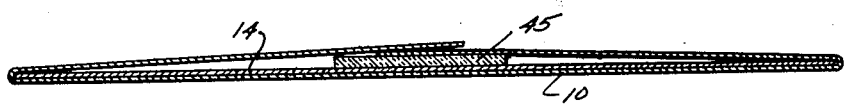
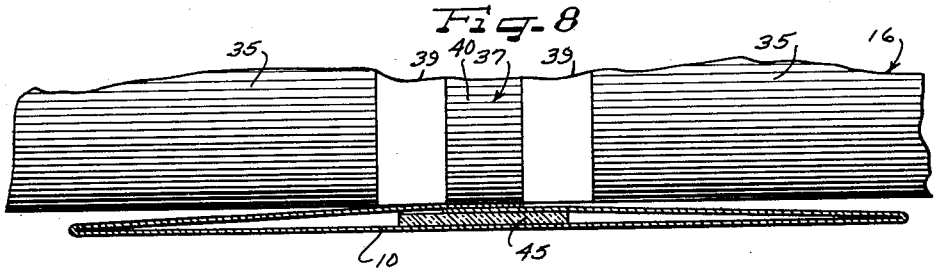
INVENTOR.
Vernon C. Ambler

3,153,607
APPARATUS AND METHOD FOR HEAT SEALING THE LONGITUDINAL SEAMS OF HEAT SEALABLE TUBULAR WEBS
Vernon C. Ambler, Box 272, Paris, Tex.
Filed May 8, 1961, Ser. No. 108,333
14 Claims. (Cl. 156—203)

This invention relates to improvements in a method and apparatus for sealing the center overlapping plies of flat tubular webs, to be thereafter made into paper bags.

In the making of paper bags from plastics, such as cellophane, or from coated or waxed glassine or plain or laminated glassine, it is advantageous that the center overlapping plies of the tubular web forming the center seam of the web be sealed by heat to form a moisture proof permanently sealed tubular web, and that the sealing operation be at the speed of printing on the web, to accommodate the web to first be printed and then formed into a flat tubular web and sealed in a continuous operation, which is a part of a continuous bag making operation.

Due to the need for time and pressure on the area to be sealed to provide the necessary heat to seal the seam, and the fact that where the web is made from a waxed glassine paper, no toxic solvents for the wax may be used in the adhesive, it has heretofore not been possible to heat seal the center seam of the web in a continuous printing and bag making operation.

This has made it necessary to use pressure sensitive adhesives for sealing the center seam of waxed or laminated glassine paper. Such adhesives, however, do not provide positive moisture proof seals, particularly when used to seal waxed glassine paper, since the adhesive is to a waxed surface which oftentimes softens in hot weather.

In the present day bag making machines, the center or back seams on bag making webs have been made by leading the web under a heated wheel or disk, so that the web is in contact with this wheel or disk in the area of the seam, which is directly under the point of contact of the wheel or disk with the web. Since the web is traveling at a relatively high rate of speed, this point of contact is limited to a relatively small lineal area which is dependent on the area of the cut away portion of the former, which has been provided to provide more than point contact, but which cannot give contact of more than an inch or a fraction of an inch. Since the tube is traveling at a relatively high rate of speed, this contact will be a substantially instantaneous contact, even where the former is provided with a cut away portion to lengthen the point of contact of the disk with the web. The transfer of heat for sealing, therefore, must take place instantaneously and no practical means has been provide to lengthen the heating time and apply pressure on the seal as it is heated, and still seal the web at the speed of printing.

It is, therefore, an important object of my invention to provide a novel and improved method and apparatus overcoming the foregoing problems and making it possible to heat seal the center seams of the thin webs for the making of cellophane or waxed paper bags in a simple and economical manner.

A further object of the invention is to provide an improved form of apparatus for heat sealing the center or back seam of the thin tubular webs for making paper bags and providing a uniform moisture proof permanently sealed seam.

A further and important object of the invention is to provide an improved form of apparatus for heat sealing the center seams of tubular webs for making plastic and waxed paper bags, in which a heater drum is provided having the web partially wrapped therearound and having a heater therein of substantially the width of the seam to be sealed, and in which a floating insulating strip insulates the plies of the flat tubular web from each other while passing around the heater drum and applies pressure to the overlapping plies of the web against the heating means to effect a simple and effective heat sealing operation of the center seam of the web.

Still another object of the invention is to provide a method of heat sealing the center seam of a flat tubular web, by insulating the plies of the material from each other along the overlapping plies of the center seam of the tubular web and by wrapping the plies partially around a rotatably traveling heater drum in contact with a narrow ring-like heated surface thereof, and applying pressure on the plies by the floating insulator therefor.

These and other objects of the invention will appear from time to time as the following specification proceeds and with reference to the accompanying drawings wherein:

FIGURE 1 is a diagrammatic side elevational view of a portion of a bag making machine illustrating the former for forming the web into a flat tubular form and the means for heat sealing the center longitudinal seam of the web as the web passes from the former.

FIGURE 1A is a diagrammatic view drawn to a larger scale than FIGURE 1 and showing the insulator strip between the plies of the tubular web passing under the heater drum and over the idler roll conforming the tubular web to the heater drum;

FIGURE 2 is a diagrammatic side view of a form of heater drum that may be used to heat seal the center seam of the tubular web;

FIGURE 3 is a diagrammatic end view taken of the heater drum with certain parts broken away and certain other parts shown in transverse section;

FIGURE 4 is a plan view of the floating insulator, insulating the plies of the tubular web from each other and applying pressure to the tubular web as it passes along the heater drum;

FIGURE 5 is a view in side elevation of the insulator shown in FIGURE 4;

FIGURE 6 is a diagrammatic fragmentary top plan view of the tube former, showing the former forming the tube over the insulator;

FIGURE 7 is a diagrammatic sectional view taken through the tube former, insulator and formed web substantially along line VII—VII of FIGURE 1 and showing the flattened tube prior to sealing;

FIGURE 8 is a diagrammatic sectional view taken through the flattened tube and insulator, with the seam in contact with the heating means on the drum and showing the tube during the sealing operation thereof;

FIGURE 9 is a diagrammatic sectional view taken through the tube and inside former along line IX—IX of FIGURE 1 and illustrating the spreading of the tube to its required lateral dimension; and FIGURE 10 is a fragmentary diagrammatic sectional view, similar to FIGURE 8 and illustrating a modification of the invention.

In the embodiment of the invention illustrated in the drawings, the reference numeral 10 indicates generally a flattened web of thin paper or film of indefinite length that has been printed and provided with transverse bands T of a thermoplastic adhesive and of sufficient width lengthwise of the bag to afford both a seal for the bottom of one bag and a heat sealable top for an adjacent bag, as in my joint application with Esca E. Anderson and Fay Wright, Serial No. 706,680, filed June 2, 1958, and a continuation-in-part of application Serial No. 553,371, filed December 15, 1955, now abandoned.

The web 10 may be formed of a thin cellophane or may be formed of a thin paper such as glassine paper, suitable for waxing to give a relatively translucent bag or may be formed from a laminated glassine paper, a saran coated cellophane, or various other translucent materials commonly used for the making of paper or plastic bags to contain potato chips and other similar foods.

The web 10 as it comes from a mill roll in the flat, first goes through an applicator and then into the turning press, and then goes to a waxing machine. The applicator which may be driven from the press, applies to the surface that is to be the inner surface of the bag, localized transverse spaced bands of thermoplastic adhesive T and then applies a longitudinal band of thermoplastic adhesive L along one side of the flat web. Where the web is to be waxed it is then provided with a coating of wax on both sides, or on the side that would be the inner side of the finished bag.

The term "wax" is here used in a generic sense to indicate any wax or wax-like coating having the desired moisture and greaseproofness, flexibility and other properties. Paraffin wax compositions including modifiers or additives, such as vinyl, polyethylene, polyisobutylene, rubber hydrochloride and other polymers are intended to be included within the meaning of the term "wax."

The particular adhesive used is not critical except insofar as it should be an adhesive of a type that when reactivated by heat, will form a good firm seal. Various forms of thermoplastic adhesives are suitable, one such form of adhesive being a vinyl plastisol emulsion.

On laminated glassine that is not waxed, a hot melt thermoplastic adhesive is most effective in that the thermoplastic material itself flows under pressure into the finest crevices and spaces. To effect this spreading of the relatively high melting point thermoplastic adhesive, the material must not only be heated sufficiently hot, but there must be sufficient dwell to permit the heat to penetrate through as many as four plies of the laminated paper where the bags are made from laminated glassine, and there must be sufficient pressure applied to the melted adhesive to uniformly squeeze into the paper.

It is, of course, understood that when sealing a cellophane or saran coated cellophane material, the band of adhesive L is not necessary.

From the applicator (not shown), the undersurface of the web 10 passes over a tension roll 11 and the upper surface of the web then passes into contact with the undersurface of a smoothly bent thin former shoe 13 of a former 12. As shown in FIGURES 1 and 6, the former 12 includes the smoothly bent thin former shoe 13 and a horizontal former portion 14 forming a continuation of the smoothly bent thin former shoe 13 and extending to an idler roll 15 adjacent a heater drum 16. The upper surface of the idler roll 15 is slightly below the horizontal top surface of the former portion 14.

The former shoe 13 and former portion 14 may be of a one piece construction and are herein shown as being secured to the bottom of a shoe 17 as by machine screws 18 or like securing devices. The shoe 17 is in turn suspended from a support 19 on the lower end of a shank 21 depending from the support 19.

From the heater drum 16, the web passes about a chilled roll 22. From the chilled roll 22, the web may pass through sealing rolls (not shown) for sealing the web transversely. The sealing rolls and mechanism for transversely sealing the web are clearly shown and described in my joint application with Esca E. Anderson and Fay Wright Serial No. 706,680, and now Patent No. 3,015,996, dated January 9, 1962, and no part of the present invention so not herein shown or described further.

The web then passes between draw rolls 23 driven at the peripheral speed of the heater drum 16 and drawing the web along the former 12, heater drum 16 and chill roll 22 as well as through the transverse sealing apparatus (not shown).

The smoothly bent shoe 13 of the former 12 has a downwardly inclined portion formed integrally with the horizontally extended portion 14 and joined together by a smoothly rounded heel portion 25 providing a tube-forming member rectangular in plan view of the width of the inside dimensions of the tube of the ultimate bags formed therefrom (FIGURE 6). To assist in the forming operation, a spring wire 27 of generally M-shaped resiliently overlies the forwardly extending horizontal portion 14 of the forming shoe. The looped end portions 28 of the wire 27 act as plows to assist in folding over the margins of the web 10 with an adhesive strip L therebetween, while a looped intermediate portion 29 of the wire retains the overlapping margins of the web into engagement with each other. Parallel spaced longitudinally extending end portions 30, 30 of the straight lines of the M-shaped wire 27 are secured to a supporting surface so as to develop the proper degree of resilient pressure between the wire 27 and the folded over portions of the web 10, to accomplish the tube-forming operation with a minimum of abrasion of the waxed surface of the web.

The heater drum 16, as shown in FIGURES 2 and 3 is mounted on a transverse shaft 31 suitably journalled in the frame for the bag making machine and driven by power at the peripheral speed of the draw rolls 23. The drum 16 has opposite end walls 33 suitably mounted on the shaft 31 and having open portions 34 therein to accommodate the circulation of air through the drum and maintain the cylindrical surfaces 35 of the drum, on opposite sides of a ring heater 37 cool. The cylindrical surfaces 35 may be made from a material of high heat conductivity and form a support for the web 10 on opposite sides of the overlapping marginal plies thereof, and are suitably secured to the end walls 33 of the drum and extend outwardly from insulating strips 39, at the inner ends of said cylindrical surfaces and are shown in FIGURES 2 and 3 as being in the forms of insulating rings extending along opposite sides of the ring heater 37. The ring heater 37 may be in the form of a hollow ring of iron or a like material having a flat outer surface 40 between the insulating strips 39 and having a resistor heater 41 therein. The resistor heater 41 may be energized through slip rings 43 on the shaft 31 suitably connected with a source of power by resilient contact fingers 44. The heater drum 16 thus provides a cooled contact surface for the web 10 for the entire width thereof on opposite sides of the center seam of the web and has the center seam of the web pressed into engagement therewith.

Referring now to the means for insulating the outer ply of the web from the heat of the heater ring 37 as the web passes about the heater drum 16 and for applying pressure on the seam, a floating flexible insulating strip 45, of a width slightly greater than the width of the center seam, is secured between the bottom of the former shoe 17 and the top of the horizontally extending former plate 14 by the machine screws 18, securing the former plate to the former shoe (FIGURE 6). The insulator strip 45 extends along the top surface of the former plate 14 over the idler 15 and beyond said idler for a distance substantially greater than the wrap of the web about the heater drum 16. The insulator strip 45 is of a width substantially equal to the width of the seam and diverges at its outer end into a widened inside former 47. The widened inside former 47 is of a width equal to the required inside dimensions of the tubular web and spreads the tubular web to size and serves to smooth the web as it passes to the chilled roll 22.

The insulator and inside former may be made from any flexible material of the required thickness which is a non-conductor of heat and is sufficiently resistant to heat so that it will not curl or be deformed by the heat. Laminated fiber glass has been found to be a suitable material for this purpose, although various other materials having high insulating qualities may be used, one such material being a tetrafluoroethylene known to the trade as Teflon.

As shown in FIGURE 5, the former strip 45 is reinforced at its tail end by the same material from which the strip is made as indicated by reference characters 48. The widened inside former 47 is also shown as being reinforced by reinforcement members 49 which may be additional laminations of fiber glass as may be the reinforcement strips 48, where the insulator strip and the inside former are made from fiber glass.

The insulator strip 45 and former 47 on the free end thereof are carried about the heater drum 16 by the tension on the web, and said insulator strip and former are restrained from travel with the web as the web passes from the heater drum 16 around the chill roll 22 to the draw rolls 23 and press the overlapping plies of the web, forming the back or center seam into engagement with the ring heater 37 to effect sealing of the center seam and insulation of the outer ply of the web from the ring heater 37.

The insulator strip 45, fastened at one end, extending between the plies of the web, drawn under the heater drum 16 by the draw rolls 23, is maintained under tension by the pull of the web and in effect floats throughout its length and exerts pressure on the center seam of the web as the web passes along the insulator strip. The pressure exerted by the insulator strip alone is great enough to obtain a good seal on cellophane and other easily sealed coated materials.

A pressure roll 50 bearing against the insulator strip and the sealed area of the seam, as the web passes from contact with the heated ring 37 is provided to exert pressure on the web and seam where required for the sealing of such materials as waxed glassine and laminated glassine where it is desirable to press the heated wax from the adhesive.

The pressure roll 50 is rotatably journalled at its opposite ends in a rockable support 51 diagrammatically shown in FIGURE 1 as being rockable about the axis of a transverse shaft 53. An arm 54 extends from the rockable support 51 and is secured thereto and has a counterweight 55 mounted thereon for adjustable movement therealong. The top surface of lever arm 54 may be toothed or serrated as indicated by reference character 56 to register with corresponding teeth or serrations in the counterweight 55. A hand screw 57 may be provided to hold the counterweight 55 in a selected position of adjustment along the lever 54, to bias the pressure roll 50 into engagement with the web along the area of the center seal, at the required pressure.

In the operation of sealing the center seam of the web, assuming the flat printed web has been trained about the idler roll 11 along the former 12 under the heater drum 15 and about the chilled roll 22 to the draw rolls 23, the draw rolls 23 will maintain tension on the web and draw the web along the former and about the heater drum 16 and chill roll 22, with the insulator strip 45 and former 47 on the end thereof between the plies of the web. This will wrap the insulator strip about the heater drum 16 to the extent the web is wrapped about said heater drum and exert sufficient pressure on the seam to effect sealing of the seam, after which the inside former 47 forms the inside of the tubular web to size, as it passes to the chill roll 22, to be chilled thereby.

The insulator strip 45 thus applies pressure against the seam and pressurizes the seam into engagement with the heater ring 37 as diagrammatically illustrated in FIGURES 1 and 8, the successive forming and sealing operations being illustrated in FIGURES 6 through 9, showing the relation of the insulator strip and inside former with respect to the web prior to and during and after sealing.

It should here be understood that the pressure roll 50 need only be used when sealing materials that are difficult to seal and that the insulator strip 45 itself provides sufficient pressure to sealed cellophane and many other readily sealable materials.

It should further be understood that the mounting of the pressure roll 50 and the means for biasing the roll to press against the web and insulator strip is only an illustrative showing, and that said pressure roll may be pressurized in various other ways than the manner shown herein.

In the modification of the invention illustrated in FIGURE 10, a heater drum 16a like the heater drum 16 is shown, but having a ring heater 37a and insulating rings or strips 39a on opposite sides thereof, recessed beneath cylindrical surfaces 35a of the drum.

The drum 16a is particularly adapted for sealing laminated glassine and multi-ply papers, in that the recessed ring heater and insulator rings accommodate the pressure of the insulator 45 on the seam to be relieved and thereby enable the thicker tubular webs to be more readily drawn about the heater drum to the chilled roll 22.

It should be understood that while the sealing apparatus and method of the invention is herein described as being in a printing line printing the web as it is continuously formed into a bag, that it need not be in line with a printing press, and may be an independent sealing unit, sealing the center seams of printed or unprinted webs as unrolled from a storage roll (not shown).

It may be seen from the foregoing that an extremely simple and effective heat sealing means has been provided for sealing the center seams of cellophane, wax and laminated glassine bags by heat, and that the time required for the heat sealing operation is attained by passing the bag about a heater drum, with its center seam in association with a ring heater at the transverse center of the drum and by providing a floating insulating means for insulating the plies of the tubular web from each other and readily conforming to the form of the web and serving as a pressurizing means for pressurizing the seam into engagement with the ring heater of the heater drum, as well as a means for insulating the web from the heater seam thereof.

While I have herein shown and described one form in which my invention may be embodied, it may be understood that various modifications and variations in the invention may be attained without departing from the spirit and scope of the novel concepts thereof, as defined by the claims appended hereto.

I claim as my invention:

1. In an apparatus for heat sealing the longitudinal seams of continuously moving tubular webs of thin heat sealable material suitable for making bags, a former including a former shoe, forming a flat web into a tubular form having overlapping plies extending along the center of the web, a rotatable heater drum spaced in advance of said former shoe and having a heater ring disposed intermediate the ends of said drum having an outer surface flush with the periphery of said drum and having a heating element disposed radially inwardly of the periphery of said drum, means drawing a web along said former shoe and partially wrapping the web about said drum, with the overlapping plies of the web, forming the center of the seam of the tubular web, in engagement with the outer surface of said heater ring, and a flexible insulating strip secured to said former shoe at one end and extending in advance of said former between the plies of the web beyond said heater drum and restrained from travel with the web by said former shoe, and insulating the plies of the web from each other while the web is passing along said heater drum and maintaining pressure on the overlapping plies of the web against said heater ring by the tension of said insulating strip attained by the frictional resistance between the traveling web and said insulating strip, restrained from travel with the web.

2. In an apparatus for heat sealing the longitudinal seams of continuously moving travelling webs of thin heat sealable material suitable for making paper bags, a former including a former shoe, forming a flat web into a tubular form having overlapping plies extending along the center of the web, a heater drum spaced in advance of said former shoe and having a heater ring disposed intermediate the ends thereof having a peripheral heating surface, roller means cooperating with said drum on one side of a plane parallel with and intersecting the axis of rotation of said drum, other roller means cooperating with said drum on the opposite side of said plane, both of said roller means partially wrapping a flattened tubular web along a portion of the surface of said drum, and a floating insulating strip of substantially the width of the seam to be sealed secured to said former shoe at one end and extending from said former shoe between the plies of the flattened tubular web a substantial distance beyond said second mentioned roller means, in alignment with said heater ring.

3. An apparatus in accordance with claim 2, wherein the insulating strip has a widened inside former on the free end thereof spaced beyond said second mentioned roller means and having engagement with opposite sides of the flattened web for maintaining the inside of the sealed web to size as it leaves said heater drum.

4. An apparatus in accordance with claim 3 in which the insulating strip is made from laminated fiber glass.

5. In an apparatus for heat sealing the longitudinal seams of continuously moving webs of thin heat sealable material suitable for making bags, a former forming a web into a flat tubular form having overlapping plies extending along the center of the web and including a former shoe, a heater drum in advance of said former and having a heater ring extending thereabout intermediate the ends thereof and having a heating surface substantially flush wtih the periphery of said heater drum, an idler roll in advance of said former shoe and cooperating with said heater drum at one side of a plane extending parallel to and through the axis of rotation of said heater drum, a chill roll spaced from said heater drum on the opposite side of said plane, draw rolls drawing a tubular web between said idler roll and heater drum and partially about said chill roll and maintaining the overlapping plies of the web, in engagement with said heater ring for a portion of the periphery thereof, and means for insulating the plies of the tubular web from each other and pressing the overlapping plies of the web forming the center seam into engagement with said heater ring, comprising a flexible insulating strip secured to said former shoe at one end and extending from said former shoe between the plies of the tubular web between said idler roll and heater drum and partially along and beyond said heater drum.

6. An apparatus in accordance with claim 5 wherein the insulating strip has a widened inside former extending from the free end thereof and spaced in advance of said heater drum in the direction of travel of the web, and of substantially the width of the inside dimensions of the sealed tubular web.

7. An apparatus in accordance with claim 6 in which the insulating strip and former are made from laminated fiber glass.

8. In an apparatus for heat sealing the longitudinal seams of continuously travelling tubular webs of thin heat sealable material suitable for making bags, a former forming a flat web into a flattened tubular form having overlapping plies extending along the center of the web and including a former shoe, a heater drum spaced in advance of said former and having a heater ring disposed intermediate the ends thereof having a peripheral heating surface substantially flush with the periphery of said heater drum, an idler spaced in advance of said former adjacent said heater drum and cooperating therewith on one side of a plane intersecting the axis of said heater drum and extending therealong, a chill roll spaced beyond said heater drum on the opposite side of the plane from said idler roll and cooperating with said idler roll to wrap the tubular web along said heater drum for a portion of the periphery thereof, a pressure roll engaging the outer side of the tubular web between said idler roll and chill roll and pressing the web into engagement with said heater drum, and an insulator strip of substantially the width of the seam to be sealed secured to said former shoe at one end and extending between the plies of the tubular web between and in advance of said idler roll and heater drum and said pressure roll and heater drum and having a widened inside former on the free end portion thereof between said pressure roll and chill roll, of substantially the inside dimensions of the tubular web, for forming the tubular web to size as it leaves said heater drum.

9. An apparatus in accordance with claim 8, wherein the inside former and insulating strip are made from laminated fiber glass.

10. In a method of heat sealing the longitudinal seams of continuously moving tubular webs of a thin heat sealable material suitable for making bags, the steps which comprise tensioning a tubular web partially about a heater drum with a longitudinal seam thereof in contact with a heated surface on the drum and drawing the web along the drum, providing a flexible insulator of substantial length between the plies of the web and restraining the insulator from travel with the web and insulating the plies of the web by said insulator during tensioning thereof and maintaining pressure on the longitudinal seam in contact with the heated surface on the drum by tension of the insulator attained by the frictional resistance between the web and said insulator and thereby sealing the seam, and then spreading the tubular web to its original size by engagement of the insulator with the opposite inner sides of the web as the web travels along the insulator.

11. A method of heating sealing the longitudinal seams of continuously moving heat sealable tubular webs of thin heat sealable material suitable for making bags, the steps which comprise the passing of the web partially about a heater drum having a narrow heated surface, drawing the web about the drum under tension with the longitudinal seam thereof in contact with the narrow heated surface of the drum and then cooling the web, providing a flexible insulator between the plies of the web as it passes partially about the heater drum and restraining the insulator from travel with the web and maintaining pressure on the seam of the web against the heated surface of the drum by the tension of the insulator attained by the frictional resistance between the travelling web and insulator restrained from travel.

12. A method of heat sealing the longitudinal seams of continuously moving tubular webs of a heat sealable material, the steps which comprise the passing of a flattened tubular web having longitudinally extending overlapping plies extending along the center of the web partially about a heater drum having a narrow circumferential heated surface with the overlapping plies in engagement with the heated surface, drawing the web partially about the drum under tension with the overlapping plies of the web in engagement with the heated surface of the drum and then cooling the web as it passes beyond the drum, providing a flexible insulator between the plies of the web in alignment with the overlapping plies of the web as it passes about the heater drum and restraining the insulator from travel with the web and providing a widened spreading surface on the insulator between the plies of the web as it leaves the heater drum, insulating the plies of the tubular web by the insulator during tensioning thereof and maintaining pressure on the seam against the heated surface of the drum by the tension of the insulator attained by frictional resistance between the insulator and the web, and then spreading the web to its original size by engagement of the widened spreading surface of the insulator with the interior of the web after the web passes said drum and prior to chilling of the web.

13. In an apparatus for heat sealing the longitudinal seams of continuously moving tubular webs of heat sealable material suitable for making paper bags, a former for forming a flat web into a flattened tubular web having overlapping plies extending along the center of the web and including a former shoe, a heater drum spaced in advance of said former shoe and having outer cylindrical cooling surfaces, with insulating rings extending along the inner ends of said cooling surfaces and a heater ring between said insulating rings, draw rolls spaced on the opposite side of said heater drum from said former and drawing a tubular web from said former along said heater drum for a portion of the periphery thereof with the overlapping plies of the web in engagement with said heater ring, and a flexible insulating strip secured to said former shoe and extending from said former shoe between the plies of the web in alignment with the periphery of said heater ring and insulating the plies of the web from each other while passing about said heater drum and maintaining pressure on the overlapping plies of the web against said heater ring by the tension of said insulating strip attained by the frictional resistance between said web and insulating strip.

14. An apparatus in accordance with claim 13, wherein the heater ring and insulating rings are spaced radially inwardly of the cylindrical cooling surfaces of said heater drum.

References Cited in the file of this patent

UNITED STATES PATENTS

| | | |
|---|---|---|
| 2,070,600 | Jenett | Feb. 16, 1937 |
| 2,253,946 | Waters | Aug. 26, 1941 |
| 2,358,455 | Hallman | Sept. 19, 1944 |
| 2,484,076 | Collins | Oct. 11, 1949 |
| 2,587,211 | Piazze | Feb. 26, 1952 |
| 2,643,320 | Pfenninger | June 23, 1953 |
| 2,897,875 | Rusch et al. | Aug. 4, 1959 |